Sept. 28, 1971     M. A. BERK     3,608,285

NEUTRAL START SYSTEM FOR RIDING MOWERS

Filed April 15, 1970

*INVENTOR.*
MARTIN A. BERK

United States Patent Office 3,608,285
Patented Sept. 28, 1971

3,608,285
NEUTRAL START SYSTEM FOR RIDING MOWERS
Martin Adolph Berk, Horicon, Wis., assignor to
Deere & Company, Moline, Ill.
Filed Apr. 15, 1970, Ser. No. 28,674
Int. Cl. A01d *35/26*
U.S. Cl. 56—10.2                                5 Claims

ABSTRACT OF THE DISCLOSURE

A neutral start electrical system prevents the engine on a riding mower from starting unless the mower is disengaged and the vehicle drive is disengaged. This system is based on a switch in the engine ignition circuit which normally completes the ignition circuit through an auxiliary circuit, but which removes the auxiliary circuit from the ignition circuit when the engine is running. The auxiliary circuit includes first and second addtional switches in series with each other. The first additional switch is responsive to a condition of the clutch for the vehicle drive and is open when the vehicle drive is engaged. The second additional switch is responsive to a condition of the clutch for the mower drive and is open when the mower drive is engaged. The neutral start electrical system provides an open ignition circuit if an attempt is made to start the engine while either the vehicle clutch or mower clutch is engaged to thereby prevent starting of the engine.

BACKGROUND OF THE INVENTION

The present invention relates to riding mowers, and more particularly relates to a neutral start electrical system for riding mowers.

A great many riding mowers which are presently available do not have an electric starter and are commonly provided with a recoil rope starter. The basic reason for this is to keep the cost of riding mowers within the price range of the average consumer. However, in order to start many of the riding mowers with recoil rope start engines, it is not possible for the operator to be mounted on the mower and still be in a position where he can readily pull the starter rope. The very fact that the operator cannot be mounted on the vehicle when he starts the engine creates a potential source of danger.

For example, if the operator fails to disengage the drive to the traction wheels of the riding mower before he starts the engine, the mower will take off and run uncontrolled. Also, when the operator braces himself to provide a quick pull on the starter rope, it is very easy to inadvertently place one foot under the mower unit. If the drive for the mower unit is not disengaged before the engine is started, the operator may very easily lose part of his foot.

SUMMARY OF THE INVENTION

It is therefore the primary object of the present invention to provide a neutral start electrical system for a riding mower which will prevent the mower engine from being started unless the drives for the traction wheels and mower unit are both disengaged.

Another object of the present invention is to provide a fail safe neutral start system for riding mowers which will prevent the mower engine from being started unless the drives for the traction wheels and mower unit are both disengaged and which will also prevent the mower engine from being started in the event of any break, disconnection, failure or malfunction in the neutral start system.

Still another object of the present invention is to provide a safe start electrical system for riding mowers which prevents the engine of the riding mower from being started unless the drives for the mower unit and mower traction wheels are disengaged and a brake for the traction wheels is applied.

The above and additional objects and advantages of the present invention will become apparent along with details of construction of the preferred embodiment of the invention from a reading of the following detailed description when taken in conjunction with the accompanying drawing.

DESCRIPTION OF THE PREFERRED EMBODIMENT

Figure 2:
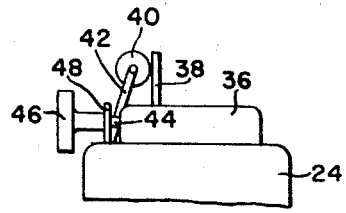
FIG. 2 is an enlarged rear elevational view of the upper portion of the engine for the riding mower.

Referring now to the drawing, a riding mower in which the principles of the present invention are incorporated is indicated generally at 10 and includes a chassis 12 mounted on front steerable wheels 14 and rear traction wheels 16. A steering pedestal 18 is mounted on the forward end of the chassis 12 and supports a steering handle bar 20. The handle bar 20 is mounted on a steering rod 22 which extends down through the steering pedestal 18 and is connected to conventional steering linkage for the front wheels 14. An engine 24 is mounted on the rear end of the chassis 12, and immediately ahead of the engine 24, a seat 26 is mounted on a pedestal 28. A rotary cutter unit 30 is suspended beneath the chassis 12 intermediate the front and rear wheels by front and rear suspension links 32 and 34.

The engine 24 is the type having a vertical crankshaft which has its output end extending below the chassis 12. A conventional recoil rope starter 36 is mounted on the top of the engine 24 and is connected to the upper end of the crankshaft in the conventional manner. A bracket 38 is secured to the top of the recoil rope starter 36 and carries a single pole double throw switch 40. The switch 40 is controlled by an arm 42 which extends down alongside the starter rope 44 and in the path of movement of the starter rope handle 46. The switch arm 42 is normally biased to a first position away from the recoil rope starter 36 so that when the starter handle 46 is pulled to start the engine 24, the switch arm 42 will move away from the starter 36 to its first position. When the rope 44 is allowed to recoil, the handle 46 will engage the switch arm 42 and move the same to its second position. A large washer 48 may be placed on the rope 44 to provide a larger switch arm engaging area on the handle 46.

The engine 24 is drivingly connected to the traction wheels 16 through a transmission 50 which is housed within the seat pedestal 28. The engine 24 is interconnected with the transmission 50 by an endless flexible belt which is loosely trained about drive and driven sheaves mounted on the lower end of the engine crankshaft and a vertical input shaft for the transmission 50, respectively. The transmission 50 is in turn connected to the drive axle for the rear traction wheels 16 in any suitable manner such as by an endless roller chain which is trained about drive and driven sprockets mounted on a transverse output shaft of the transmission 50 and the drive axle for the rear traction wheels 16 respectively. The endless flexible belt which is trained about the sheaves on the engine crankshaft and transmission input shaft is selectively tensioned and slackened by an idler sheave 52 to selectively establish and disrupt a driving connection between the engine 24 and rear traction wheels 16. In this manner, the sheave 52 functions as a clutch in the drive to the rear traction wheels.

Figure 3:
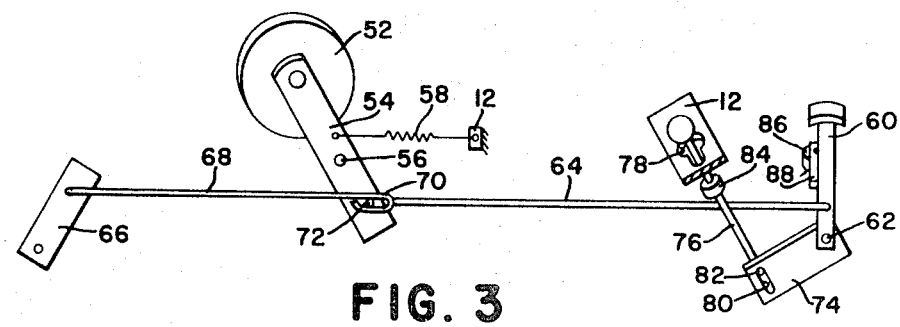
FIG. 3 is a schematic view of the clutch and brake for the traction wheels of the riding mower and the control means therefor.
Figure 4:
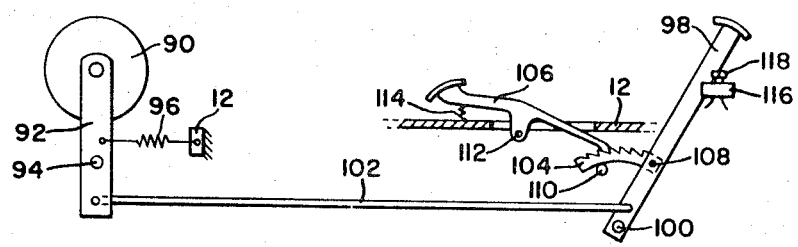
FIG. 4 is a schematic view of the clutch for the mower unit of the riding mower and the control means therefor.

In the schematic illustration of FIG. 3, the clutch or idler sheave 52 is shown as being rotatably mounted on one end of a lever 54 which is pivotally mounted intermediate its ends as at 56. A spring 58 is anchored to the lever 54 and to the chassis 12 and normally biases the sheave 52 against endless flexible belt to establish a driving connection. The lever 54 can be moved about the pivot 56 against the bias of the spring 58 to move the sheave 52 away from the endless belt by a combination clutch and brake pedal 60 which is mounted on the chassis 12 for movement about a pivot 62 between a first rearward or engaged position and a second forward or disengaged position. The pedal 60 is mounted on the left-hand side of the steering pedestal 18 so that it does not appear in FIG. 1. The pedal 60 is interconnected with the arm 54 by an elongated rod 64 which has inturned end portions extending through suitable apertures provided in the pedal 60 and arm 54.

The pedal 60 also serves to actuate a braking mechanism for the rear traction wheels and to this end is interconnected with an actuating arm 66 for the braking mechanism by an elongated rod 68. The rear end of rod 68 is provided with an inturned end portion which extends through a suitable aperture provided in the brake mechanism actuating arm 66 and its opposite end is provided with an elongated eye 70 which is positioned over the inturned rear end 72 of the clutch rod 64. The eye 70 on the brake rod 68 provides a lost motion connection between the pedal 60 and brake mechanism actuating arm 66 so that the clutch or sheave 52 is moved away from the endless belt prior to the braking mechanism being applied.

The braking mechanism can be locked in its applied condition by a parking brake which cooperates with the pedal 60. The parking brake includes a plate 74 secured to the pedal 60 for movement therewith, a parking brake lever 76, and a keyhole slot 78 provided in the chassis 12. The plate 74 is provided with an elongated slot 80 through which an inturned lower end 82 of the parking brake lever 76 extends. The slot 80 and the inturned end 82 of the lever 76 provide a lost motion connection between the lever 76 and pedal 60 so that the pedal 60 can be moved without affecting the lever 76. The parking brake lever 76 extends through the keyhole slot 78 and is provided with an annular abutment member 84 intermediate its ends. When the pedal 60 is depressed or pushed forward to disengage the driving connection between the engine 24 and traction wheels 16 and to apply the braking mechanism, the parking brake lever 76 will normally not be affected since the slot 80 permits relative movement between the plate 74 and the parking brake lever 76. However, once the braking mechanism has been applied, the parking brake lever can be raised to again bring the inturned end 82 thereof into engagement with the upper end of the slot 80. When the parking brake member 76 is raised, the annular abutment 84 moves through the enlarged portion of the keyhole slot 78 and the lever is retained in a raised position by moving the annular abutment 84 over the small portion of the keyhole slot.

A single pole, single throw switch 86 is mounted on the chassis 12 near the clutch-brake pedal 60. The switch 86 includes a switch arm 88 which is movable between open and closed positions and is normally biased toward the closed position. The switch arm 88 is positioned to the rear of the pedal 60 and extends across the path of movement thereof so that upon rearward movement of the pedal 60, the arm 88 is moved to its open position and upon forward movement of the pedal 60, the arm 88 returns to its closed position under the force of its bias.

The mower unit 30 is also driven by the engine 24 and this is accomplished by an endless flexible belt loosely trained about drive and driven sheaves on the engine crankshaft and a vertical input shaft for the mower unit, respectively. This endless belt is selectively tensioned and slackened to establish and disrupt a driving connection between the engine 24 and mower unit 30 by an idler sheave 90. In this manner, the sheave 90 functions as a clutch in the drive to the mower unit. The sheave 90 is rotatably mounted on one end of an arm 92 which is mounted either on the chassis 12 or mower unit 30 for movement about a pivot 94. By moving the arm 92 about the pivot 94, the idler sheave 90 can be moved toward or away from the endless flexible belt to tension or slacken the same. Arm 92 is normally biased in a direction to move the sheave 90 away from the endless belt to slacken the same by a spring 96. The clutch or sheave 90 can be moved to tension the endless belt by a mower unit clutch pedal 98 which is mounted on the chassis 12 for movement about a pivot 100 between a first forward or engaged position and a second rearward or disengaged position. The clutch pedal 98 is interconnected with the arm 92 by an elongated clutch rod 102 which has its opposite ends inturned and extending through suitable apertures provided in the clutch pedal 98 and arm 92.

Since the sheave 90 normally is biased to a disengaged position, it is necessary to provide some means to retain the clutch pedal 98 in its forward engaged position. This can be accomplished in any suitable manner, for example, by use of a rack segment 104 and pawl pedal 106. The rack segment 104 has its forward end pivotally connected to the pedal 98 at 108 and its rear portion slides along a pin 110 carried by the chassis 12. The pawl pedal 106 is pivotally mounted intermediate its ends on the chassis 12 by a pin 112 and has its forward end biased into engagement with the rack segment 104 by a spring 114. The pawl pedal 106 normally engages the teeth of the rack segment 104 and prevents movement of the pedal 98 to its rear disengaged position, but when the operator steps on the rear end of the pawl pedal 106, it is disengaged from the teeth of the rack segment and the pedal 98 is free to move to its rear position.

A second single pole, single throw switch 116 is provided with a switch arm 118 which is movable between open and closed positions and is normally biased to the closed position. The switch 116 is mounted on the chassis 12 adjacent the pedal 98 with its arm 118 positioned forward of the pedal 98 and extending across the path of movement thereof. When the pedal 98 is moved to its forward engaged position, it contacts the arm 118 of switch 116 and moves the same to its open position. When the pedal 98 is allowed to move to its rear disengaged position, the switch arm 118 returns to its closed position under the force of its bias.

Figure 5:
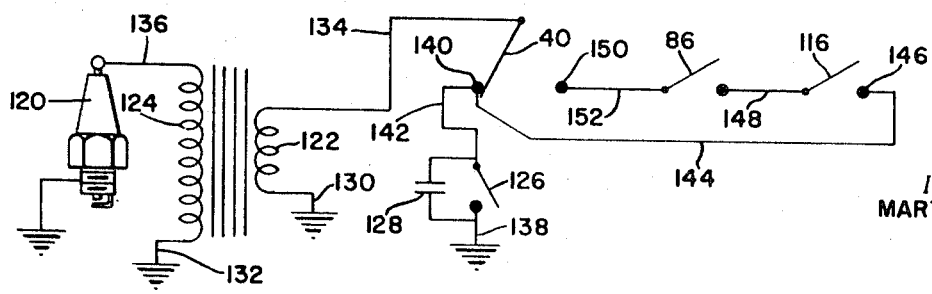
FIG. 5 is a diagram of the circuitry of a magneto ignition system and neutral start electrical system according to the present invention.

A magneto ignition system for the engine 24 is illustrated in FIG. 5 and includes the fail safe neutral start system according to the present invention. The magneto ignition system includes a spark plug 120, a magneto coil having a primary winding 122 and a secondary winding 124, points 126 and condenser 128. One end of both the primary and secondary windings 122 and 124 are grounded by conductors 130 and 132 while the opposite ends of the primary and secondary windings are connected to the pole of the switch 40 and the spark plug 120 by conductors 134 and 136. The points and condenser 126 and 128 are also grounded by a conductor 138 and are connected to a terminal 140 of the switch 40 by conductor 142. The ignition system thus far described is of conventional design with the exception of the switch 40. An auxiliary electrical circuit has one end of a conductor 144 connected to the terminal 140 of the switch 40 and the opposite end of conductor 144 connected to a terminal 146 of the switch 116. The pole of the switch 116 is connected to a terminal of the switch 86 by a conductor 148, and the pole of the switch 86 is connected to the second terminal 150 of the switch 40 by a conductor 152.

When the switch arm 42 is biased to its first position away from the recoil rope starter 36, the switch 40 is in engagement with the contact 150. When the arm 42 is moved to its second position by a starter handle 46, the switch 40 engages the contact 140 as illustrated in FIG. 5. Thus, when the starter rope 44 is pulled to start the engine 24, the circuit of the ignition system must be completed through the auxiliary circuit. However, should either one of the pedals 60 or 98 be in its engaged position, its associated switch 86 or 116 would be open and the ignition circuit through the auxiliary circuit would be incomplete or broken and would prevent the engine from starting. Therefore it is necessary that both pedals 60 and 98 be in their disengaged positions to complete the ignition circuit through the auxiliary circuit when the engine is being started. Once the engine is started and the starter rope allowed to recoil, the switch 40 is moved to the contact 140 by engagement of the starter rope handle 46 with the switch arm 42. Once the switch 40 engages the contact 140, the pedals 60 and 98 can be moved to their engaged positions since the auxiliary circuit is removed from the ignition circuit and an open switch in the auxiliary circuit will no longer break the ignition circuit.

Figure 1:
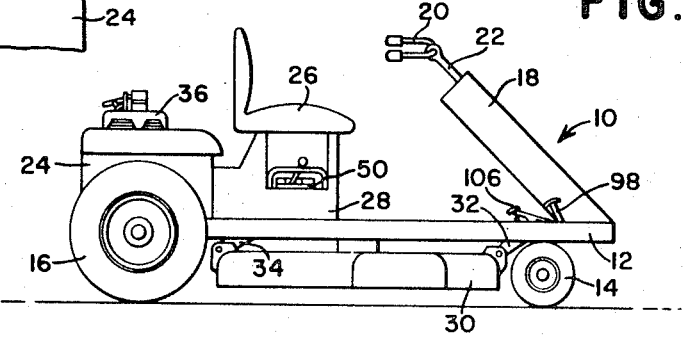
FIG. 1 is a side elevation view of a riding mower embodying the principles of the present invention.

From FIG. 1 of the drawing, it can be seen that the starter rope is positioned so that the operator cannot pull it while seated on the riding mower. If he attempts to start the engine 24 when dismounted from the mower, he will not have any success unless he first disrupts the driving connection between the engine and mower unit, disrupts the driving connection between the engine and rear traction wheels, applies the braking mechanism, and locks the braking mechanism in its applied condition with the parking brake lever. If he fails to do all of this, one or both of the switches 86 and 116 will be open when he pulls the handle 46 of the starter rope 44 the switch 40 will move to the contact 150 and the ignition circuit will be incomplete or broken due to the open switch. Therefore, before the engine 24 can be started, the riding mower has to be completely demobilized and the hazards of starting the riding mower are eliminated.

The neutral start system is fail safe since if any one of the switches should break, one of the conductors becomes loose, or an attempt is made to disconnect the switches, the ignition system could not be completed through the auxiliary circuit when the engine is started. Therefore, before the engine can be started, it is necessary that the auxiliary circuit or neutral start system be in perfect working order.

While only a single preferred embodiment of the invention has been described and illustrated, various modifications within the spirit and scope of the invention will be apparent to those skilled in the art and can be made without departing from the underlying principles thereof.

What is claimed is:

1. In combination with a riding mower including a chassis mounted on steerable and traction wheels, an engine mounted on the chassis and having an ignition circuit, means providing a driving connection between the engine and traction wheels and including a first engageable and disengageable clutch means for selectively establishing and disrupting the driving connection, a driven mower unit coupled to the chassis, and means providing a driving connection between the engine and mower unit and including a second engageable and disengageable clutch means for selectively establishing and disrupting the driving connection between the engine and mower unit, a neutral start electrical system comprising: an auxiliary circuit connected in series with the ignition circuit; first electical switch means common to both the ignition circuit and the auxiliary circuit responsive to the condition of the engine to complete the ignition circuit through the auxiliary circuit when the engine is being started and to remove the auxiliary circuit from the ignition circuit when the engine is running; second electrical switch means in the auxiliary circuit responsive to the condition of the first clutch means to be open when the first clutch means is engaged and closed when the first clutch means is disengaged; and third electrical switch means in the auxiliary circuit in series with the second switch means responsive to the condition of the second clutch means to be open when the second clutch means is engaged and closed when the second clutch means is disengaged, whereby the ignition circuit will be open if either or both of the first and second clutch means are engaged when the engine is being started.

2. The combination set forth in claim 1 wherein the engine is a recoil rope start engine having a starter rope with a handle thereon, the first switch means is a double throw switch having an actuating arm movable between a first position in which it completes the ignition circuit through the auxiliary circuit and a second position in which it removes the auxiliary circuit from the ignition circuit, the actuating arm is normally biased to the first position, and the first switch means is mounted on the engine with its actuating arm extending across the path of movement of the starter rope handle to be contacted thereby and moved to the second position when the starter rope is recoiled.

3. The combination set forth in claim 2 wherein said first and second clutch means include first and second pedal means movably mounted on the chassis for independent movement between first and second positions engaging and disengaging the respective clutch means upon movement to the first and second positions respectively, each of the second and third switch means has an arm movable between open and closed positions and biased toward the closed position, and the second and third switch means are mounted on the chassis in positions adjacent the first and second pedal means with their respective arms extending across the paths of movement of the first and second pedal means, to be engaged and moved to their open positions by the respective pedal means upon movement of the pedal means to their first positions.

4. The combination set forth in claim 3 wherein brake means are provided for the rear traction wheels and are operatively coupled to the first pedal means for application upon movement of the first pedal means to its second position whereby the brake means must be applied before the engine can be started.

5. The combination set for the in claim 2 wherein the ignition circuit includes a coil having primary and secondary windings, a spark plug, points and a condenser, the first switch means is interposed to the ignition circuit between the primary winding and the points and condenser, and the auxiliary circuit is connected to the ignition circuit between the primary winding and the points and condenser.

References Cited

UNITED STATES PATENTS 3,169,358   2/1965   Ertsgaard et al.   56—10.5
3,229,452   1/1966   Hasenbank   56—10.5

A. HARRY LEVY, Primary Examiner

U.S. Cl. X.R.

180—53, 77, 82, 103; 192—84

UNITED STATES PATENT OFFICE
CERTIFICATE OF CORRECTION

Patent No. 3,608,285          Dated 28 September 1971

Inventor(s) Martin Adolph Berk

It is certified that error appears in the above-identified patent and that said Letters Patent are hereby corrected as shown below:

Column 6, line 2, change "electical" to -- electrical --; line 35, after "positions" insert -- for --; line 54, change "for the" to -- forth --.

Signed and sealed this 21st day of March 1972.

(SEAL)
Attest:

EDWARD M. FLETCHER, JR.　　　　　ROBERT GOTTSCHALK
Attesting Officer　　　　　　　　Commissioner of Patents